(12) United States Patent
Lim et al.

(10) Patent No.: US 10,581,306 B2
(45) Date of Patent: Mar. 3, 2020

(54) POWER SYSTEM HAVING TWO MOTORS (71) Applicants: HYUNDAI MOTOR COMPANY, Seoul (KR); KIA MOTORS CORPORATION, Seoul (KR)

(72) Inventors: Seong Yeop Lim, Seoul (KR); Hyun Jun Soh, Seongnam-si (KR); Jeongbin Yim, Incheon (KR); Jeong Min Shin, Suwon-si (KR); Young Jun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/830,995

(22) Filed: Dec. 4, 2017

(65) Prior Publication Data
US 2019/0013721 A1    Jan. 10, 2019

(30) Foreign Application Priority Data
Jul. 10, 2017   (KR) .................. 10-2017-0086914

(51) Int. Cl.
*B60L 50/15*   (2019.01)
*H02K 16/00*   (2006.01)
(Continued)

(52) U.S. Cl.
CPC .............. *H02K 16/00* (2013.01); *B60L 50/15* (2019.02); *B60L 50/16* (2019.02); *H02K 7/006* (2013.01); *H02K 7/02* (2013.01); *H02K 7/1085* (2013.01); *H02K 11/225* (2016.01); *B60L 2220/42* (2013.01); *H02K 11/21* (2016.01)

(58) Field of Classification Search
CPC ........ H02K 16/00; H02K 7/006; B60L 50/16; B60L 50/15; B60W 10/08; B60K 6/44
See application file for complete search history.

(56) References Cited

U.S. PATENT DOCUMENTS

| | | | | |
|---|---|---|---|---|
| 6,023,648 | A | * | 2/2000 | Murasugi ................ F16H 61/20 477/93 |
| 6,048,289 | A | * | 4/2000 | Hattori ..................... B60K 6/48 477/15 |

(Continued)

FOREIGN PATENT DOCUMENTS

| JP | 4406883 B2 | 2/2010 |
|---|---|---|
| KR | 10-2010-0015063 A | 2/2010 |
| KR | 10-0951393 B1 | 4/2010 |

*Primary Examiner* — John D Walters
*Assistant Examiner* — James J Triggs
(74) *Attorney, Agent, or Firm* — Morgan, Lewis & Bockius LLP (57) ABSTRACT

A power system having two motors includes: a first motor transmitting power to an output shaft of an engine or receiving power from the output shaft of the engine; a first clutch selectively connecting a first rotor of the first motor to the output shaft and mounted on a first power transmitting member that operably connects the output shaft and the first rotor of the first motor; a second motor outputting power to an input shaft of a transmission; and a second clutch selectively connecting the output shaft to a second rotor of the second motor and mounted on a second power transmitting member that operably connects the output shaft and the second rotor of the second motor.

9 Claims, 5 Drawing Sheets (51) Int. Cl.
    *H02K 11/225* (2016.01)
    *H02K 7/02* (2006.01)
    *H02K 7/108* (2006.01)
    *H02K 7/00* (2006.01)
    *B60L 50/16* (2019.01)
    *H02K 11/21* (2016.01)

(56) References Cited

U.S. PATENT DOCUMENTS

| | | | |
|---|---|---|---|
| 7,753,149 B2 | 7/2010 | Tabata et al. | |
| 8,231,504 B2* | 7/2012 | Hendrickson | B60K 6/26 477/5 |
| 8,474,556 B2* | 7/2013 | Wang | B60L 58/20 180/65.22 |
| 8,602,939 B2* | 12/2013 | Yamazaki | B60W 20/14 477/5 |
| 8,678,116 B2* | 3/2014 | Barnes | B60K 6/48 123/198 R |
| 9,409,565 B2* | 8/2016 | Bureau | B60K 6/442 |
| 2003/0075368 A1* | 4/2003 | Takaoka | B60K 6/365 180/65.235 |
| 2006/0249319 A1* | 11/2006 | Hoare | B60K 6/26 180/65.23 |
| 2006/0276289 A1* | 12/2006 | Hirata | B60K 6/445 475/5 |
| 2007/0202987 A1* | 8/2007 | Kakinami | B60K 6/40 477/3 |
| 2010/0048338 A1* | 2/2010 | Si | B60W 20/15 475/5 |
| 2010/0087287 A1* | 4/2010 | Tabata | B60K 6/40 477/3 |
| 2011/0160015 A1* | 6/2011 | Ren | B60K 6/442 475/5 |
| 2011/0259698 A1* | 10/2011 | Arnold | B60K 6/36 192/48.1 |
| 2013/0138283 A1* | 5/2013 | Cho | B60K 6/442 701/22 |
| 2013/0297126 A1* | 11/2013 | Yamazaki | B60W 20/40 701/22 |
| 2016/0272192 A1* | 9/2016 | Ashizawa | B60W 20/40 |
| 2017/0088116 A1* | 3/2017 | Kim | B60W 20/11 |
| 2017/0268661 A1* | 9/2017 | Noda | B60K 6/365 |
| 2019/0135103 A1* | 5/2019 | Kuze | B60K 6/52 |

* cited by examiner

POWER SYSTEM HAVING TWO MOTORS

CROSS-REFERENCE TO RELATED APPLICATION

This application is based on and claims the benefit of priority to Korean Patent Application No. 10-2017-0086914 filed on Jul. 10, 2017 with the Korean Intellectual Property Office, the entire contents of which are incorporated herein by reference.

TECHNICAL FIELD

The present disclosure relates to a power system provided in a hybrid electric vehicle (HEV) or a plug-in hybrid electric vehicle (PHEV). More particularly, the present disclosure relates to a power system having two motors which efficiently generate driving power using power of an engine and power of the motors and reduce fuel consumption.

BACKGROUND

A hybrid electric vehicle is a vehicle using two or more power sources and uses an engine and a motor as power sources in general. The hybrid electric vehicle can be achieved in various layouts according to arrangements of the engine and the motor.

One type of arrangements of an engine and a motor in the hybrid electric vehicle is TMED (Transmission Mounted Electric Device) type. According to the TMED type, the engine, the motor and a transmission are connected on a drive shaft in series.

An engine clutch is disposed between the engine and the motor. The hybrid electric vehicle can be operated at an electric vehicle (EV) mode or a hybrid electric vehicle (HEV) mode depending on engagement and disengagement of the engine clutch.

The vehicle travels only with driving torque of the motor at EV mode and travels with driving torque of the motor and the engine at HEV mode, and the EV mode and the HEV mode are achieved by engagement and disengagement of the engine clutch.

Recently, use of hybrid electric vehicles or plug-in hybrid electric vehicles is increasing, and demand for expanding a region where the hybrid electric vehicles or the plug-in hybrid electric vehicles can travel in the EV mode is also increasing to reduce fuel consumption.

In order to expanding the region where the hybrid electric vehicle travels in the EV mode, it is necessary to increase capacity of the motor provided in the hybrid electric vehicle. Accordingly, it has been researched to increase capacity of the motor in a TMED system or to use two or more motors.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a power system having two motors having advantages of increasing a travel distance and output by the motors by efficiently disposing the two motors between the engine and the transmission in a TMED system.

A power system having two motors according to an exemplary embodiment of the present disclosure may include: a first motor transmitting power to an output shaft of an engine or receiving power from the output shaft of the engine; a first clutch selectively connecting a first rotor of the first motor to the output shaft and mounted on a first power transmitting member that operably connects the output shaft and the first rotor of the first motor; a second motor outputting power to an input shaft of a transmission; and a second clutch selectively connecting the output shaft to a second rotor of the second motor and mounted on a second power transmitting member that operably connects the output shaft and the second rotor of the second motor.

The power system may further include: a first partition disposed between the first motor and the second motor and extending inwardly from a housing, fixedly disposed at an exterior side of the first motor and the second motor, in a radial inner direction of the power system; a second partition disposed between the second motor and the transmission and extending in the radial inner direction; a first bearing interposed between the first partition and the output shaft; and a second bearing interposed between the second partition and the input shaft.

The power system may further include: a first resolver detecting a rotation speed of the first rotor and mounted on the first partition; and a second resolver detecting a rotation speed of the second rotor and mounted on the second partition.

A power system having two motors according to another exemplary embodiment of the present disclosure may include: a first motor transmitting power to an output shaft of an engine or receiving power from the output shaft of the engine; a first power transmitting member operably connecting the output shaft of the engine to a first rotor of the first motor; a second motor outputting power to an input shaft of a transmission; and a clutch selectively connecting the output shaft to a second rotor of the second motor and mounted on the second power transmitting member that operably connects the output shaft and the second rotor of the second motor.

The power system may further include: a first partition disposed between the first motor and the second motor and extending inwardly from a housing, fixedly disposed at an exterior side of the first motor and the second motor, in a radial inner direction of the power system; an elongated portion extending from a radial inner end of the first partition in an axial direction of the power system; and a first bearing disposed between the elongated portion and the output shaft.

In one aspect, a center line of gravity of a rotational part of the first motor may lie within a region of the first bearing.

In another aspect, the center line of gravity of the rotational part of the first motor may lie on a center of the first bearing.

The rotational part of the first motor may include a rotating member connecting the first rotor to the output shaft.

The rotating member may include: a first member splined onto the output shaft; a second member integrally connected to an end portion of the first member and extending outwardly from the end portion of the first member in a radial outer direction of the power system; and a third member extending from a radial outer end of the second member to face the elongated portion, wherein the first bearing is interposed between the first member and the elongated portion.

The power system may further include a mass mounted on a side of the first motor.

The mass may be disposed along a rotating direction of the rotor.

The mass may be continuously or discontinuously disposed along the rotating direction of the rotor.

According to the exemplary embodiments of the present disclosure, the engine, the first motor, the second motor and the transmission are sequentially disposed on one drive shaft, and driving torque is generated using the first and second motors. Therefore, more output can be obtained.

In a case that the vehicle travels with one motor among two motors, another motor can generated electricity by the engine. Therefore, travel distance by the motors may substantially increase.

DETAILED DESCRIPTION

Exemplary embodiments of the present disclosure will hereinafter be described in detail with reference to the accompanying drawings.

Since size and thickness of each component illustrated in the drawings are arbitrarily represented for ease of explanation, the present disclosure is not limited to the drawings. Thicknesses of many parts and regions are enlarged.

Description of components that are not necessary for explaining the present exemplary embodiment will be omitted, and the same constituent elements are denoted by the same reference numerals in this specification.

In the following description, dividing names of components into first, second, and the like is to divide the names because the names of the components are the same as each other and an order thereof is not particularly limited.

Figure 1:
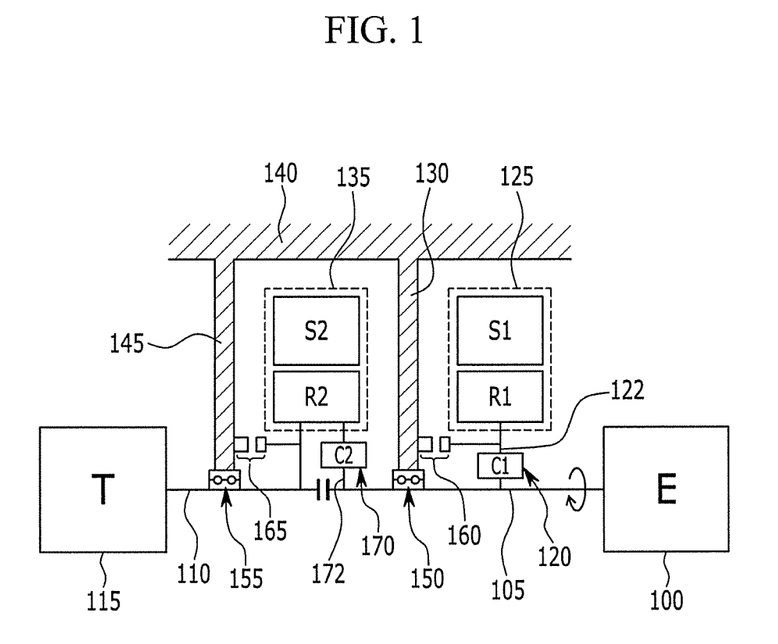
FIG. 1 is a schematic diagram of a power system having two motors according to the first exemplary embodiment of the present disclosure.

FIG. 1 is a schematic diagram of a power system having two motors according to the first exemplary embodiment of the present disclosure.

Referring to FIG. 1, the power system includes an engine 100, an output shaft 105, a first power transmitting member 122, a first motor 125, a first resolver 160, a first bearing 150, a second power transmitting member 172, a first clutch 120, a second clutch 170, a second motor 135, a second resolver 165, a second bearing 155, an input shaft 110, a transmission 115, a housing 140, a first partition 130 and a second partition 145.

The output shaft 105 of the engine 100 is disposed in parallel with or on the same axis as the input shaft 110 of the transmission 115, and the first motor 125 is arranged to transmit power to the output shaft 105 through the first power transmitting member 122.

Here, the first motor 125 includes a first rotor R1 and a first stator S1. Since structures and functions of the rotor and the stator are well known to a person of an ordinary skill in the art, detailed description thereof will be omitted.

The first clutch 120 is disposed on the first power transmitting member 122 and connects the first rotor R1 of the first motor 125 to the output shaft 105 or disconnects the first rotor R1 from the output shaft 105.

The second motor 135 is arranged to transmit power to the input shaft 110 of the transmission 115 and includes a second rotor R2 and a second stator S2. The second rotor R2 is directly connected to the input shaft 110 to rotate with the input shaft 110.

The second power transmitting member 172 transmits power of the output shaft 105 to the second rotor R2 of the second motor 135. The second clutch 170 is disposed on the second power transmitting member 172 between the output shaft 105 and the second rotor R2, and connects the output shaft 105 to the second rotor R2 or disconnects the output shaft 105 from the second rotor R2.

The housing 140 is fixedly disposed to a radially exterior of the first motor 125 and the second motor 135, and the first partition 130 extends radially inwardly from the housing 140 between the first motor 125 and the second motor 135 and separates a space where the first motor 125 is mounted from a space where the second motor 135 is mounted.

In addition, the second partition 145 extends radially inwardly from the housing 140 between the transmission 115 and the second motor 135 and separates the space where the second motor 135 is mounted from a space where the transmission 115 is mounted.

The first bearing 150 is disposed at an end portion of the first partition 130 and rotatably supports the output shaft 105. The second bearing 155 is disposed at an end portion of the second partition 145 and rotatably supports the input shaft 110.

The first resolver 160 is mounted on the first partition 130 and detects rotation of the first rotor R1 of the first motor 125 to detect rotation speed of the first motor 125. The second resolver 165 is mounted on the second partition 145 and detects rotation of the second rotor R2 of the second motor 135 to detect rotation speed of the second motor 135. Since structure and function of the resolver is well known to a person of an ordinary skill in the art, detailed description thereof will be omitted.

The first motor 125 according to the first exemplary embodiment of the present disclosure can transmit power to the output shaft 105 according to operation of the first clutch 120, based on FIG. 1 and above description. In addition, the first motor 125 can generate electric energy by the power of the engine 100 and the generated energy may be charged in an additional battery.

The power of the engine 100 or the first motor 125 can be transmitted to the second rotor R2 of the second motor 135 according to operation of the second clutch 170. In addition, the second motor 135 can transmit power to the input shaft 110 of the transmission 115. When the second clutch 170 is released, the second motor 135 can solely transmit the power to the input shaft 110 of the transmission 115.

In addition, while the first motor 125 generates electric energy by the engine, the second motor 135 can solely transmit the power to the input shaft 110 of the transmission 115.

Figure 2:
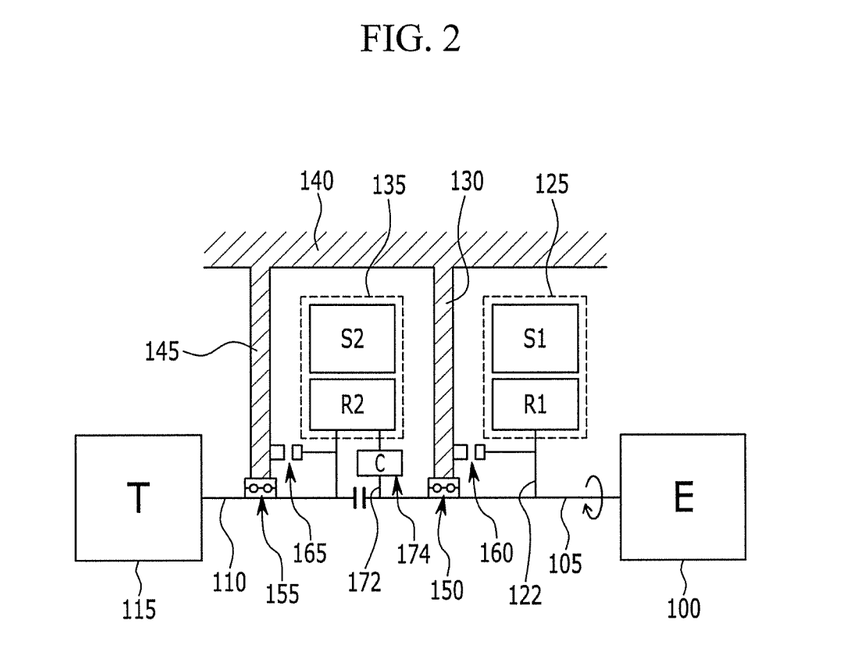
FIG. 2 is a schematic diagram of a power system having two motors according to the second exemplary embodiment of the present disclosure.

FIG. 2 is a schematic diagram of a power system having two motors according to the second exemplary embodiment of the present disclosure, and differences between the first and second exemplary embodiments will mainly described.

The second power transmitting member 172 is arranged to transmit the power of the output shaft 105 to the second rotor R2 of the second motor 135. A clutch 174 is disposed on the second power transmitting member 172 between the output shaft 105 and the second rotor R2, and connects the output shaft 105 to the second rotor R2 or disconnects the output shaft 105 from the second rotor R2.

The first motor 125 according to the second exemplary embodiment of the present disclosure transmits the power to the output shaft 105 and the first motor 125 can generate electric energy by the power of the engine 100, based on FIG. 1, FIG. 2 and above description.

The power of the engine 100 or the power of the first motor 125 can be transmitted to the second rotor R2 of the second motor 135 according to operation of the clutch 174. In addition, the second motor 135 can transmit the power of the input shaft 110 of the transmission 115. When the clutch 174 is released, the second motor 135 can solely transmit the power to the input shaft 110 of the transmission 115.

Figure 3:
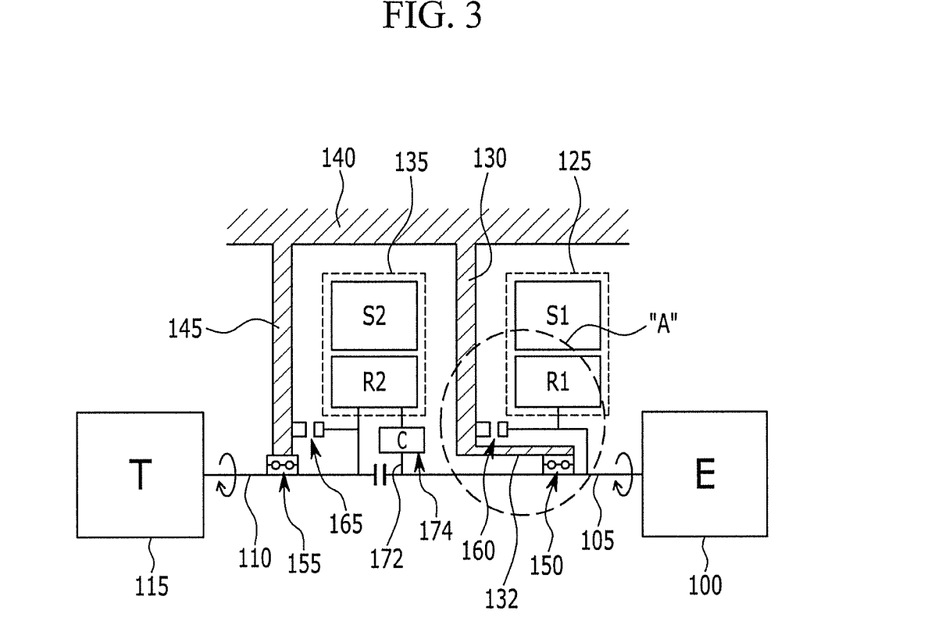
FIG. 3 is a schematic diagram of a power system having two motors according to the third exemplary embodiment of the present disclosure.

FIG. 3 is a schematic diagram of a power system having two motors according to the third exemplary embodiment of the present disclosure. Description of the same or the similar components will be omitted and differences will be mainly described.

Referring to FIG. 3, an elongated portion 132 is integrally formed with a radial inner end of the first partition 130 and extends in parallel with the output shaft 105 in an axial direction.

In addition, the first bearing 150 is interposed between the elongated portion 132 and the output shaft 105, and the output shaft 105 is rotatably disposed on the elongated portion 132 through the first bearing 150.

In addition, a center line of gravity (reference numeral '310' in FIG. 4) of a rotational part of the first motor 125 lie on a center portion of the first bearing 150. Therefore, even though the first rotor R1 rotates at a high speed, the first bearing 150 can firmly supports the rotational part of the first motor 125.

Herein, the rotational part of the first motor 125 may include the first rotor R1 and a rotating member (reference numeral '320' in FIG. 4) disposed on the first power transmitting member 122 connecting the first rotor R1 with the output shaft 105.

Figure 4:
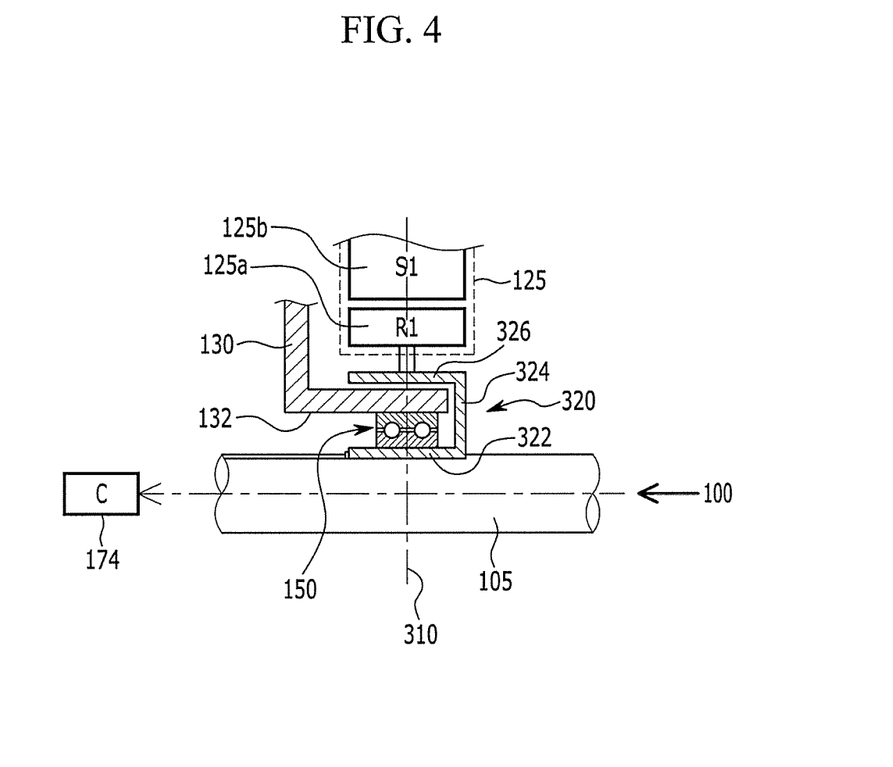
FIG. 4 is partially enlarged view of the third exemplary embodiment of the present disclosure.

FIG. 4 is partially enlarged view of the third exemplary embodiment of the present disclosure.

Referring to FIG. 4, the rotating member 320 includes a first member 322, a second member 324 and a third member 326.

The first member 322 is formed in the axial direction and is splined to the output shaft 105. The second member 324 is integrally formed with an end portion of the first member 322 and extends in a radial outer direction. The third member 326 is integrally formed with at a radial outer end of the second member 324 and extends in parallel with the first member 322 in the axial direction.

The elongated portion 132 is integrally connected with the radial inner end of the first partition 130 and extends in the axial direction. The elongated portion 132 is disposed between the first member 322 and the second member 324 and the first bearing 150 is interposed between the elongated portion 132 and the first member 322.

As described above, the center line 310 of gravity of the first rotor R1 and the rotating member (reference numeral '320' in FIG. 4) disposed on the first power transmitting member 122 connecting the first rotor R1 with the output shaft 105, as the rotational part of the first motor 125, lies on the center portion of the first bearing 150.

Therefore, even though the first rotor R1 rotates at a high speed, the first bearing 150 strongly supports the rotational part of 310.

Figure 5:
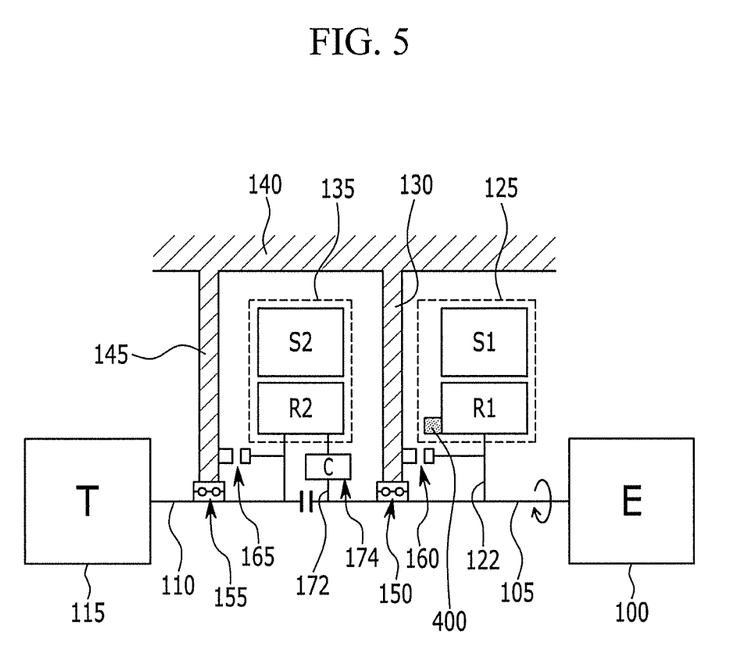
FIG. 5 is a schematic diagram of a power system having two motors according to the fourth exemplary embodiment of the present disclosure.

FIG. 5 is a schematic diagram of a power system having two motors according to the fourth exemplary embodiment of the present disclosure. Description of the same or the similar components of the second exemplary embodiment will be omitted and differences will be mainly described.

Referring to FIG. 5, a mass 400 is disposed at a side of the first rotor R1 in the rotational part of the first motor 125.

Since rotational moment of the first rotor R1 is increased due to addition of the mass 400, rotational safety of the output shaft 105 increases and vibration and noise due to output fluctuation of the engine 100 can be effectively reduced.

The mass 400 may be continuously or discontinuously disposed along a rotating direction of the first rotor R1.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A power system having two motors, comprising:
   a first motor transmitting power to an output shaft of an engine or receiving power from the output shaft of the engine;
   a first clutch selectively connecting a first rotor of the first motor to the output shaft and mounted on a first power transmitting member that operably connects the output shaft and the first rotor of the first motor;
   a second motor outputting power to an input shaft of a transmission;
   a second clutch selectively connecting the output shaft to a second rotor of the second motor and mounted on a second power transmitting member that operably connects the output shaft and the second rotor of the second motor;
   a first partition disposed between the first motor and the second motor and extending inwardly from a housing, fixedly disposed at an exterior side of the first motor and the second motor, in a radial inner direction of the power system;
   a second partition disposed between the second motor and the transmission and extending inwardly from the housing in the radial inner direction;
   a first bearing interposed between the first partition and the output shaft; and
   a second bearing interposed between the second partition and the input shaft.

2. The power system of claim 1, further comprising:
   a first resolver detecting a rotation speed of the first rotor and mounted on the first partition; and
   a second resolver detecting a rotation speed of the second rotor and mounted on the second partition.

3. A power system having two motors, comprising:
   a first motor transmitting power to an output shaft of an engine or receiving power from the output shaft of the engine;
   a first power transmitting member operably connecting the output shaft of the engine to a first rotor of the first motor;
   a second motor outputting power to an input shaft of a transmission;

a clutch selectively connecting the output shaft to a second rotor of the second motor and mounted on the second power transmitting member that operably connects the output shaft to the second rotor of the second motor;

a first partition disposed between the first motor and the second motor and extending inwardly from a housing, fixedly disposed at an exterior side of the first motor and the second motor, in a radial inner direction of the power system;

an elongated portion extending from a radial inner end of the first partition in an axial direction of the power system; and a first bearing disposed between the elongated portion and the output shaft.

4. The power system of claim 1, wherein a center line of gravity of a rotational part of the first motor lie within a region of the first bearing.

5. The power system of claim 4, wherein the center line of gravity of the rotational part of the first motor lie on a center of the first bearing.

6. The power system of claim 4, wherein the rotational part of the first motor includes a rotating member connecting the first rotor to the output shaft, wherein the rotating member comprises a first member splined onto the output shaft;

a second member integrally connected to an end portion of the first member and extending outwardly from the end portion of the first member in a radial outer direction of the power system; and a third member extending from a radial outer end of the second member to face the elongated portion, and wherein the first bearing is interposed between the first member and the elongated portion.

7. The power system of claim 3, further comprising a mass mounted on a side of the first motor.

8. The power system of claim 7, wherein the mass is disposed along a rotating direction of the rotor.

9. The power system of claim 8, wherein the mass is continuously or discontinuously disposed along the rotating direction of the rotor.

* * * * *